US012416184B2

(12) United States Patent
Niegmann

(10) Patent No.: US 12,416,184 B2
(45) Date of Patent: Sep. 16, 2025

(54) COUPLING ARRANGEMENT FOR LOCK DEVICE, AND LOCK DEVICE

(71) Applicant: ASSA ABLOY AB, Stockholm (SE)

(72) Inventor: Kaj Niegmann, Hägersten (SE)

(73) Assignee: ASSA ABLOY AB, Stockholm (SE)

( * ) Notice: Subject to any disclaimer, the term of this patent is extended or adjusted under 35 U.S.C. 154(b) by 230 days.

(21) Appl. No.: 18/257,949

(22) PCT Filed: Dec. 1, 2021

(86) PCT No.: PCT/EP2021/083806
§ 371 (c)(1),
(2) Date: Jun. 16, 2023

(87) PCT Pub. No.: WO2022/128480
PCT Pub. Date: Jun. 23, 2022

(65) Prior Publication Data

US 2024/0018803 A1 Jan. 18, 2024

(30) Foreign Application Priority Data

Dec. 18, 2020 (SE) .................................... 2051507-8

(51) Int. Cl.
*E05B 47/00* (2006.01)
*E05B 13/00* (2006.01)

(52) U.S. Cl.
CPC ........ *E05B 47/0012* (2013.01); *E05B 13/005* (2013.01); *E05B 2047/0017* (2013.01); *E05B 2047/0023* (2013.01)

(58) Field of Classification Search
CPC .... E05B 17/044; E05B 17/045; E05B 17/049; E05B 13/005; E05B 13/101;
(Continued)

(56) References Cited

U.S. PATENT DOCUMENTS 6,487,884 B1 * 12/2002 Constantinou ........ E05B 47/068 70/279.1
7,770,944 B2 * 8/2010 Yuan ....................... E05B 47/06 292/195

(Continued)

FOREIGN PATENT DOCUMENTS

DE 202008006082 7/2008
DE 102008028800 12/2009

(Continued)

OTHER PUBLICATIONS

"International Application Serial No. PCT EP2021 083806, International Search Report mailed Mar. 31, 2022", 5 pgs.

(Continued)

*Primary Examiner* — Alyson M Merlino
(74) *Attorney, Agent, or Firm* — Schwegman Lundberg & Woessner, P.A.

(57) ABSTRACT

Coupling arrangement for a lock device, the coupling arrangement comprising an input and an output element rotatable about a rotation axis; an engaging member movable between a first and second position; an electric motor arranged to affect movement of the engaging member between the first and second positions; a coupling member rotationally locked to the input element and axially movable relative to the input element between a decoupled position, where a rotation of the input element is not transmitted by the coupling member to a rotation of the output element, and a coupled position where a rotation of the input element is transmitted by the coupling member to a rotation of the output element; and a transmission mechanism arranged to transmit a rotation of the coupling member to a movement of the coupling member from the decoupled position to the coupled position when the engaging member adopts the second position.

19 Claims, 11 Drawing Sheets

(58) Field of Classification Search
CPC .. E05B 13/106; E05B 47/0676; E05B 47/068; E05B 47/0684; E05B 47/0692; E05B 2047/0026; E05B 2047/0028; E05B 2047/0031
See application file for complete search history.

(56) References Cited

U.S. PATENT DOCUMENTS

| | | | | |
|---|---|---|---|---|
| 10,597,902 | B2 * | 3/2020 | Guo | E05B 47/068 |
| 2005/0050928 | A1 * | 3/2005 | Frolov | E05B 47/068<br>70/277 |
| 2006/0254328 | A1 | 11/2006 | Pearson | |
| 2017/0306646 | A1 | 10/2017 | Guo et al. | |

FOREIGN PATENT DOCUMENTS

| | | |
|---|---|---|
| EP | 1046770 | 10/2000 |
| EP | 2204518 | 7/2010 |
| EP | 3741934 | 11/2020 |
| JP | 4843738 | 10/2011 |
| JP | 5173529 | 4/2013 |
| KR | 20200079046 | 7/2020 |
| SE | 524285 | 7/2004 |
| WO | 9964704 | 12/1999 |

OTHER PUBLICATIONS

"International Application Serial No. PCT EP2021 083806, Written Opinion mailed Mar. 31, 2022", 9 pgs.
"Swedish Application Serial No. 2051507-8, Office Action mailed Sep. 6, 2021", 10 pgs.
"Swedish Application Serial No. 2051507-8, Office Action mailed Nov. 22, 2022", 5 pgs.

* cited by examiner

COUPLING ARRANGEMENT FOR LOCK DEVICE, AND LOCK DEVICE

CROSS-REFERENCE TO RELATED APPLICATION(S)

This application is a national stage application under 35 U.S.C. § 371 of PCT Appl. No. PCT/EP2021/083806, titled "Coupling Arrangement for Lock Device, and Lock Device," filed Dec. 1, 2021, which claims priority to Swedish Patent Appl. No. 2051507-8, filed Dec. 18, 2020, each of which is incorporated herein by reference in its entirety.

TECHNICAL FIELD

The present disclosure generally relates to a coupling arrangement for a lock device. In particular, a coupling arrangement for a lock device, which coupling arrangement comprises an input element, an output element and a coupling member, and a lock device comprising such coupling arrangement, are provided.

BACKGROUND

Some lock devices comprise a cylinder housing, an output element rotatable relative to the cylinder housing about a rotation axis, a knob rotatable about the rotation axis, and an electromechanical coupling arrangement for selectively coupling the knob with the output element. When a user has been authorized, the coupling arrangement couples the knob and the output element and the lock device can be opened by turning the knob. Such lock device may be referred to as a digital lock cylinder.

In some lock devices of this type, the coupling arrangement comprises an electric motor, and an engaging member, such as a pin, driven by the electric motor linearly in parallel with the rotation axis between a decoupled position and a coupled position. The arrangement of the electric motor in parallel with the rotation axis and the movement of the engaging member in parallel with the rotation axis however add size to the lock device in the axial direction, i.e. along the rotation axis. The lock device may therefore protrude from a door face and may thereby require an escutcheon or rosette to hide the protrusion.

SUMMARY

One object of the present disclosure is to provide a coupling arrangement for a lock device, which coupling arrangement has a compact design.

A further object of the present disclosure is to provide a coupling arrangement for a lock device, which coupling arrangement has a small size.

A still further object of the present disclosure is to provide a coupling arrangement for a lock device, which coupling arrangement has a cost-effective design.

A still further object of the present disclosure is to provide a coupling arrangement for a lock device, which coupling arrangement has a low power consumption.

A still further object of the present disclosure is to provide a coupling arrangement for a lock device, which coupling arrangement has a design of low complexity.

A still further object of the present disclosure is to provide a coupling arrangement for a lock device, which coupling arrangement is secure.

A still further object of the present disclosure is to provide a coupling arrangement for a lock device, which coupling arrangement provides a reliable operation.

A still further object of the present disclosure is to provide a coupling arrangement for a lock device, which coupling arrangement solves several or all of the foregoing objects in combination.

A still further object of the present disclosure is to provide a lock device comprising a coupling arrangement, which lock device solves one, several or all of the foregoing objects.

According to one aspect, there is provided a coupling arrangement for a lock device, the coupling arrangement comprising an input element rotatable about a rotation axis; an output element rotatable about the rotation axis; an engaging member movable between a first position and a second position; an electric motor arranged to affect movement of the engaging member between the first position and the second position; a coupling member rotationally locked to the input element with respect to the rotation axis and axially movable relative to the input element along the rotation axis between a decoupled position, where a rotation of the input element is not transmitted by the coupling member to a rotation of the output element, and a coupled position, where a rotation of the input element is transmitted by the coupling member to a rotation of the output element; and a transmission mechanism arranged to transmit a rotation of the coupling member to a movement of the coupling member from the decoupled position to the coupled position when the engaging member adopts the second position.

When the coupling member adopts the coupled position, the output element of the lock device can be rotated by rotating the input element. Thus, in the coupled position of the coupling member, the lock device can be locked or unlocked by rotating the input element.

When the coupling member adopts the decoupled position, a rotation of the input element is not transmitted to a rotation of the output element. In the decoupled position of the coupling member, the input element and the coupling member may be freely rotatable around the rotation axis relative to the output element. Thus, in the decoupled position of the coupling member, the lock device cannot be locked or unlocked by rotating the input element.

The coupling member is arranged to not transmit a rotation of the input element to a rotation of the output element in the decoupled position, and to transmit a rotation of the input element to a rotation of the output element in the coupled position. The coupling member thereby functions as a clutch.

In the second position, the engaging member may engage the coupling member. In the first position, the engaging member may be disengaged from the coupling member. The engaging member may be arranged to adopt any of the first position and the second position when the coupling member is in the decoupled position. The coupling member may comprise one or more recesses. The engaging member may engage one recess in the second position and may be disengaged from each recess in the first position.

Since a rotation of the coupling member is transmitted by the transmission mechanism to a movement of the coupling member from the decoupled position to the coupled position when the engaging member adopts the second position, the coupling arrangement enables the engaging member to move between the first position and the second position in a direction perpendicular to the rotation axis. This in turn enables the coupling arrangement to be made more compact and smaller along the rotation axis, in comparison with a prior art coupling arrangement where an engaging member moves in parallel with the rotation axis between a decoupled position and a coupled position engaging the output element. In this way, also the overall lock device can be made more compact and smaller.

The input element may be fixed to, or constituted by, a manually maneuverable actuating element, such as a knob. Since a rotation of the input element is transmitted to a movement of the coupling member from the decoupled position to the coupled position when the engaging member adopts the second position, the coupling member is moved from the decoupled position to the coupled position by manual force, and not by the electric motor. The position of the engaging member (which is controlled by the electric motor) is however decisive of whether or not the coupling member will be moved from the decoupled position to the coupled position when the input element is rotated by manual force. The electric motor therefore indirectly contributes to movement of the coupling member from the decoupled position to the coupled position.

Since the coupling member is moved from the decoupled position to the coupled position by rotation of the input element, a distance for the engaging member between the first position and the second position can be rather short. This further contributes to a compact design of the coupling arrangement.

The transmission mechanism may take various forms in order to mechanically transmit a rotation of the coupling member to a movement of the coupling member along the rotation axis from the decoupled position to the coupled position when the engaging member adopts the second position. According to one variant, the transmission mechanism is formed by the coupling member, or by the engaging member and the coupling member. The transmission mechanism may however optionally comprise further components in addition to the engaging member and the coupling member.

The input element may be configured to rotate continuously about the rotation axis. Thereby, a seamless access can be provided.

The coupling member may move in a forward direction when moving from the decoupled position to the coupled position. Conversely, the coupling member may move in a rearward direction when moving from the coupled position to the decoupled position. The output element may be arranged forward of the coupling member.

The coupling member may be slidable along the input element between the decoupled position and the coupled position. The coupling member may thus be a sliding member. The coupling member may enclose the input element.

Alternatively, or in addition, the coupling member may be concentric with the rotation axis.

The input element may comprise one or more input shafts. Correspondingly, the output element may comprise one or more output shafts.

The output element may comprise a locking member, such as a tailpiece. The output element may be arranged to drive a bolt in a lock case between an engaged position where the bolt engages a strike plate, and a disengaged position where the bolt is retracted from the strike plate.

The second position may lie radially inward of the first position with respect to the rotation axis. The coupling member may be have a generally cylindrical shape, or cylindrical shape.

The electric motor may be a linear motor for affecting movement of the engaging member between the first position and the second position. The electric motor may be powered by a battery. Alternatively, or in addition, the electric motor may be powered by means of energy harvesting.

The electric motor may be arranged to affect movement of the engaging member between the first position and the second position linearly in an actuating direction. The electric motor may be elongated. In this case, the electric motor may be concentric with the actuating direction.

The actuating direction and the rotation axis may be non-parallel. The actuating direction may for example be angled 45 degrees to 135 degrees, such as 80 degrees to 100 degrees, to the rotation axis.

The actuating direction may be angled approximately 90 degrees, such as 90 degrees, to the rotation axis.

The coupling arrangement may further comprise an actuating member arranged to be driven by the electric motor, and an engaging spring arranged to force the engaging member relative to the actuating member from the first position towards the second position. The actuating member, the engaging spring and the engaging member may form a spring loaded assembly for selectively engaging the coupling member. The engaging spring may be arranged between the actuating member and the engaging member.

The electric motor may comprise a threaded and rotatable motor shaft. In this case, the actuating member may threadingly engage the motor shaft such that a rotation of the motor shaft causes a linear movement of the actuating member.

The actuating member may be movable between a first actuating position and a second actuating position. In this case, the engaging spring may be arranged to force the engaging member from the first position to the second position when the actuating member adopts the second actuating position. Thus, by moving the actuating member from the first actuating position to the second actuating position, the electric motor can affect movement of the engaging member from the first position to the second position.

For example, when the electric motor is not actuated such that the actuating member is in the first actuating position, the engaging member is held in the first position by the engaging spring. When the electric motor is actuated such that the actuating member moves from the first actuating position to the second actuating position and the engaging member is not aligned with a recess in the coupling member, the actuation of the electric motor causes the engaging spring to be compressed. When the coupling member is rotated such that the engaging member becomes aligned with a recess in the engaging member, the engaging spring forces the engaging member relative to the actuating member from the first position and into the second position where the engaging member enters the recess. The engaging member may thus be arranged to adopt the second position only when the actuating member is in the second actuating position and when one recess of the coupling member is rotationally aligned with the engaging member with respect to the rotation axis.

The transmission mechanism may comprise at least one cam profile. In this case, the engaging member may be arranged to engage one of the at least one cam profile in the second position. Each cam profile may be provided on the coupling member, e.g. on a radially outer circumference thereof. Each cam profile may comprise one or more surfaces at an angle to the rotation axis, e.g. angled 40 degrees to 80 degrees relative to the rotation axis.

Each cam profile may be an edge of a recess in the coupling member. When the engaging member is in the second position and engages one of the one or more cam profiles, the engagement causes the coupling member to be pushed forward along the rotation axis when the coupling member rotates around the rotation axis.

The coupling member may comprise a circular track. In this case, the engaging member may be arranged to engage the track. The track may partly or entirely surround the coupling member. In any case, the track may lie in a plane perpendicular to the rotation axis. When the engaging member engages the track, the coupling member is held in the coupled position. Each cam profile may lie between the track and the output element.

The electric motor may be arranged to affect movement of the engaging member from the second position to a third position. In this case, the second position may lie between the first position and the third position, and the engaging member may be arranged to engage the track when the engaging member adopts the third position and the coupling member adopts the coupled position. Also in the third position, the engaging member may engage the coupling member. The movement of the engaging member from the first position to the second position, and the subsequent movement of the engaging member from the second position to the third position, provide a two step engagement of the coupling member by the engaging member.

The third position may lie radially inward of the second position with respect to the rotation axis. The second position may lie radially between the first position and the third position with respect to the rotation axis.

As mentioned above, the engaging member may be arranged to adopt any of the first position and the second position when the coupling member adopts the decoupled position along the rotation axis. The engaging member may be arranged to adopt the third position when the coupling member adopts the coupled position along the rotation axis. The coupling member may be closer to the output element in the coupled position than in the decoupled position.

As a possible alternative, the engaging member may engage the track while the engaging member is in the second position. For example, an angular distance between two recesses in the coupling member may be utilized to rotate the output element by means of the input element when the coupling member adopts the coupled position.

The engaging spring may be arranged to force the engaging member from the second position to the third position when the actuating member adopts the second actuating position. Thus, a distance moved by the actuating member from the first actuating position to the second actuating position may be equal to or larger than a distance moved by the engaging member from the first position to the third position.

The coupling arrangement may further comprise a coupling arranged to transmit a rotation of the coupling member to a rotation of the output element when the coupling member adopts the coupled position. The coupling may comprise a first coupling part and a second coupling part. The first coupling part may be provided on the coupling member and/or the second coupling part may be provided on the output element.

The coupling may be a Hirth coupling. A Hirth coupling provides a self-centering effect and thereby prevents jamming of the coupling arrangement. The Hirth coupling may comprise tapered teeth on each of the first coupling part and the second coupling part that mesh together when the coupling member adopts the coupled position. The coupling may alternatively be a dog clutch.

The coupling arrangement may further comprise a coupling force device arranged to force the coupling member towards the decoupled position. The coupling force device may be a spring, such as a compression coil spring. When the engaging member is in the third position, the coupling member is held by the engaging member in the coupled position against the force of the coupling force device. When the engaging member is retracted from the third position to the first position, the coupling force device forces the coupling member from the coupled position back to the decoupled position, e.g. in the rearward direction along the rotation axis.

According to a further aspect, there is provided a lock device comprising a coupling arrangement according to the present disclosure. The lock device may for example be a lock cylinder. In this case, the lock device may constitute a digital lock cylinder or an electromechanical lock cylinder. The lock device can replace various lock cylinders, for example a door lock, a padlock or a bike lock.

The lock device may further comprise a cylinder housing. In this case, the electric motor, the engaging member and the coupling member may be arranged inside the cylinder housing. In this way, resistance against tampering or sabotage can be further prevented.

The lock device may further comprise a manually maneuverable actuating element. The actuating element may for example be a lever handle, a knob or a thumbturn. The actuating element may be configured to be contacted and moved by a hand of a user. The actuating element may be be rigidly connected to, or integrally formed with, the input element. When the user turns the actuating element, the input element and the coupling member rotate in common about the rotation axis.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
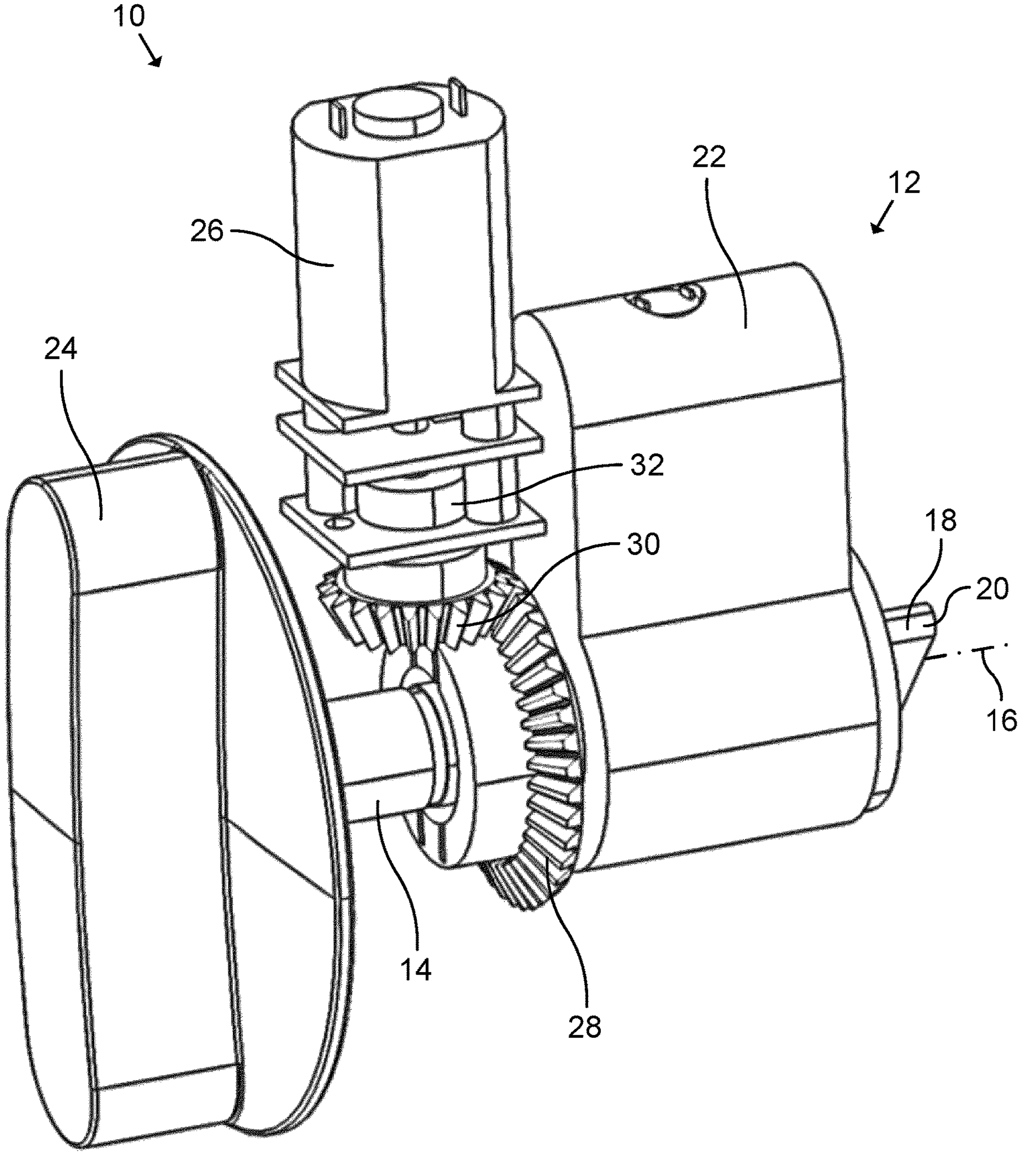
FIG. 1: schematically represents a perspective view of a lock device comprising a coupling arrangement.

In the following, a coupling arrangement for a lock device, which coupling arrangement comprises an input element, an output element and a coupling member, and a lock device comprising such coupling arrangement, will be described. The same or similar reference numerals will be used to denote the same or similar structural features.

FIG. 1 schematically represents a perspective view of a lock device 10. The lock device 10 comprises a coupling arrangement 12. The coupling arrangement 12 comprises an input element 14 rotatable about a rotation axis 16, and an output element 18 rotatable about the rotation axis 16. The output element 18 of this example comprises a tailpiece 20. The tailpiece 20 is one example of a locking member according to the present disclosure.

The lock device 10 of this example further comprises a cylinder housing 22. A part of the coupling arrangement 12 is arranged inside the cylinder housing 22. The input element 14 protrudes from one side of the cylinder housing 22 and the tailpiece 20 is positioned on an opposite side of the cylinder housing 22.

The lock device 10 of this example further comprises a knob 24. The knob 24 is one example of an actuating element according to the present disclosure. The knob 24 can be rotated by hand about the rotation axis 16. The input element 14 is fixed to the knob 24 and rotates in common with the knob 24. The knob 24 and the input element 14 can rotate continuously around the rotation axis 16.

The lock device 10 of this example further comprises an electric generator 26. The electric generator 26 may for example be fixed to a door leaf (not shown). The knob 24 may in this case be rotatable relative to the door leaf.

The electric generator 26 can be driven to generate electric energy by rotation of the input element 14. To this end, the lock device 10 of this example comprises a crown wheel 28, a pinion 30 and a gearbox 32. The crown wheel 28 is fixed to the input element 14 and rotates about the rotation axis 16. The pinion 30 meshes with the crown wheel 28 and rotates about an axis perpendicular to the rotation axis 16. The crown wheel 28 and the pinion 30 here form a bevel gear. The gearbox 32 may be a gear transmission comprising one or more intermediate gear wheels. Rotation of the pinion 30 is transmitted via the gearbox 32 to a rotation of a rotor (not shown) of the electric generator 26 to thereby generate electric energy.

Figure 2:
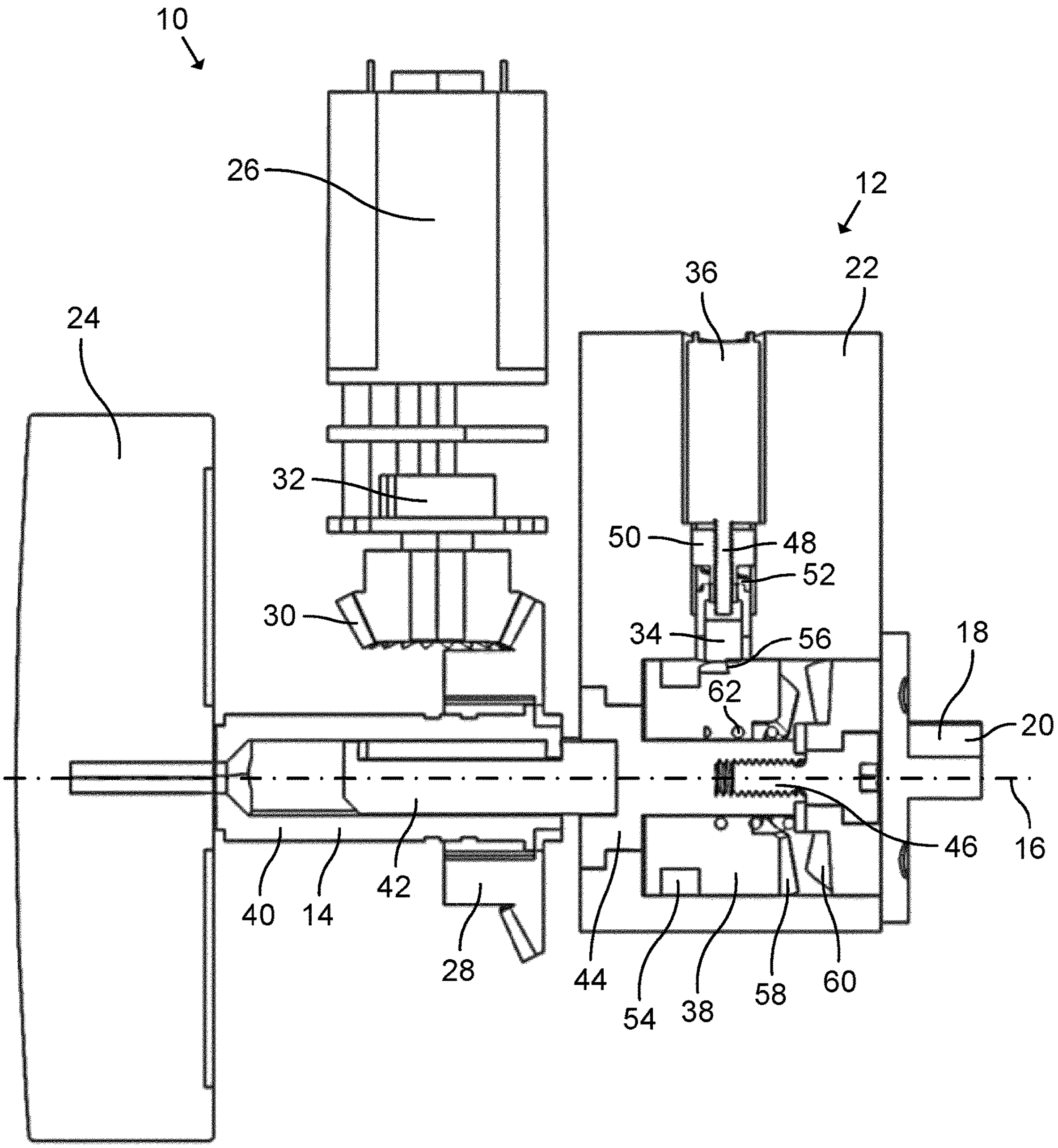
FIG. 2: schematically represents a cross-sectional side view of the lock device.

FIG. 2 schematically represents a cross-sectional side view of the lock device 10. As shown in FIG. 2, the lock device 10 further comprises an engaging member 34, an electric motor 36 and a coupling member 38.

The input element 14 of this specific example comprises an input axle 40, a square axle 42, a plug 44 and a shoulder screw 46. Each of the input axle 40, the square axle 42, the plug 44 and the shoulder screw 46 is concentric with, and rotatable around, the rotation axis 16. The input axle 40 is fixed to the knob 24. The square axle 42 is fixed to the input axle 40 by being received in the input axle 40. The plug 44 is fixed to the square axle 42. The shoulder screw 46 is fixed to the plug 44. As shown in FIG. 2, the plug 44 and the shoulder screw 46 are arranged inside the cylinder housing 22. The crown wheel 28 is fixed to the input axle 40.

The engaging member 34 is arranged inside the cylinder housing 22. The engaging member 34 of this example comprises a cylindrical pin.

The electric motor 36 is in this example arranged to be electrically powered by the electric generator 26. The lock device 10 of this example is thus electrically powered by means of energy harvesting. The electric motor 36 may alternatively be electrically powered by a battery.

The electric motor 36 comprises a threaded motor shaft 48 and an actuating member 50 threadingly engaging the motor shaft 48. By actuating the electric motor 36 to rotate the motor shaft 48, the actuating member 50 can be moved in a direction perpendicular to the rotation axis 16. As shown in FIG. 2, the electric motor 36 has an elongated shape and is oriented perpendicular to the rotation axis 16. By arranging the electric motor 36 perpendicular to the rotation axis 16, the coupling arrangement 12 does not protrude as much from the door leaf as if the electric motor 36 would be parallel with the rotation axis 16. The lock device 10 is thereby made more compact. The cylinder housing 22 may for example be only 13 mm long while containing the electric motor 36. The cylinder housing 22 will thereby fit entirely into most holes bored for cylinder housings without protruding from the door face. The door face may be positioned between the electric generator 26 and the cylinder housing 22.

The coupling arrangement 12 further comprises an engaging spring 52. The engaging spring 52 is arranged between the actuating member 50 and the engaging member 34. The engaging spring 52 is here designed as a compression coil spring encircling the motor shaft 48.

The coupling member 38 is rotationally fixed to the input element 14, here fixed to and surrounding the plug 44. Thus, when the input element 14 rotates around the rotation axis 16, also the coupling member 38 rotates around the rotation axis 16. However, the coupling member 38 is arranged to slide relative to the input element 14 along the rotation axis 16.

The coupling member 38 of this example comprises a track 54 and a cam profile 56. The cam profile 56 is one example of a transmission mechanism according to the present disclosure. The engaging member 34 can engage the cam profile 56 and the track 54, as described below. The coupling member 38 further comprises a first coupling part 58. The cam profile 56 is here arranged between the track 54 and the first coupling part 58 along the rotation axis 16. As shown in FIG. 2, also the coupling member 38 is arranged inside the cylinder housing 22.

In addition to the tailpiece 20, the output element 18 of this example further comprises a second coupling part 60. The second coupling part 60 is fixed to the tailpiece 20. The second coupling part 60 is freely rotatable relative to the shoulder screw 46. To this end, a play is provided between the shoulder screw 46 and the second coupling part 60. The second coupling part 60 is provided inside the cylinder housing 22 and the tailpiece 20 is provided outside the cylinder housing 22.

The coupling arrangement 12 of this example further comprises a coupling spring 62. The coupling spring 62 is one example of a coupling force device according to the present disclosure. The coupling spring 62 acts between the the coupling member 38 and the output element 18. The coupling spring 62 is here exemplified as a compression coil spring encircling the plug 44.

Figure 3:
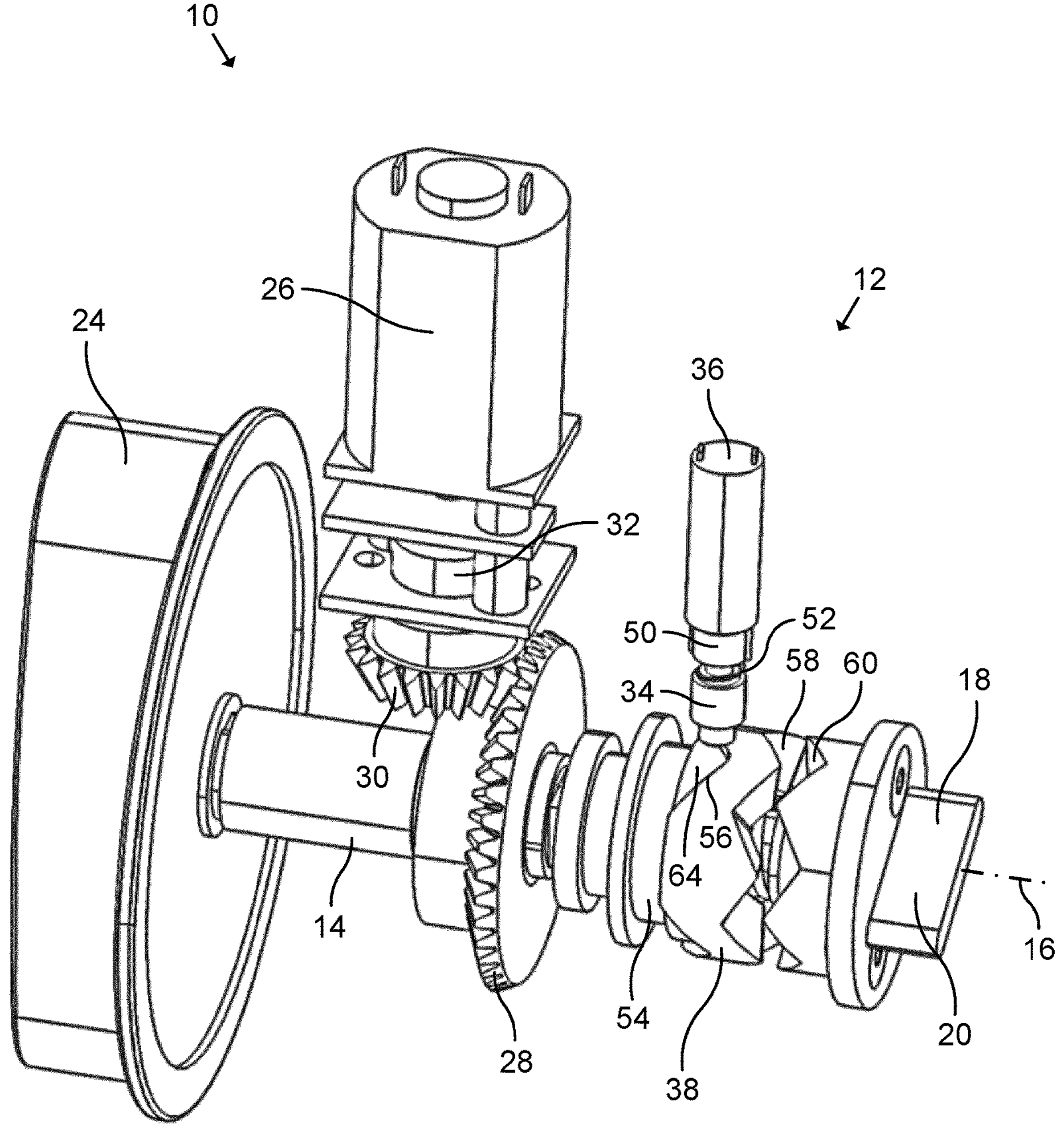
FIG. 3: schematically represents a partial perspective view of the lock device.

FIG. 3 schematically represents a partial perspective view of the lock device 10. The coupling member 38 comprises a plurality of recesses 64. In this example, the coupling member 38 comprises three recesses 64 evenly distributed around the rotation axis 16. The track 54 is deeper than each recess 64. The track 54 is provided around the entire circumference of the coupling member 38 and lies in a plane perpendicular to the rotation axis 16. In this example, an edge of each recess 64 defines one of the cam profiles 56. Each cam profile 56 comprises two surfaces. Each such surface is here inclined approximately 60 degrees relative to the rotation axis 16.

Each of the first coupling part 58 and the second coupling part 60 has a circular circumference and is centered with respect to the rotation axis 16. The first coupling part 58 and the second coupling part 60 form one example of a coupling according to the present disclosure. Each of the first coupling part 58 and the second coupling part 60 comprises a plurality of tapered teeth for being brought into meshing engagement. The coupling of this example is a Hirth coupling.

The electric generator 26 can convert mechanical energy from a manual rotation of the knob 24 to electric energy. Electric energy harvested by manually rotating the knob 24 can thereby be used to authorize a user, to command the electric motor 36 to move the actuating member 50 from a first actuating position to a second actuating position, and to command the electric motor 36 to move the actuating member 50 from the second actuating position back to the first actuating position after some time. The electric generator 26 may function as a primary energy source for the coupling device.

Figure 4:
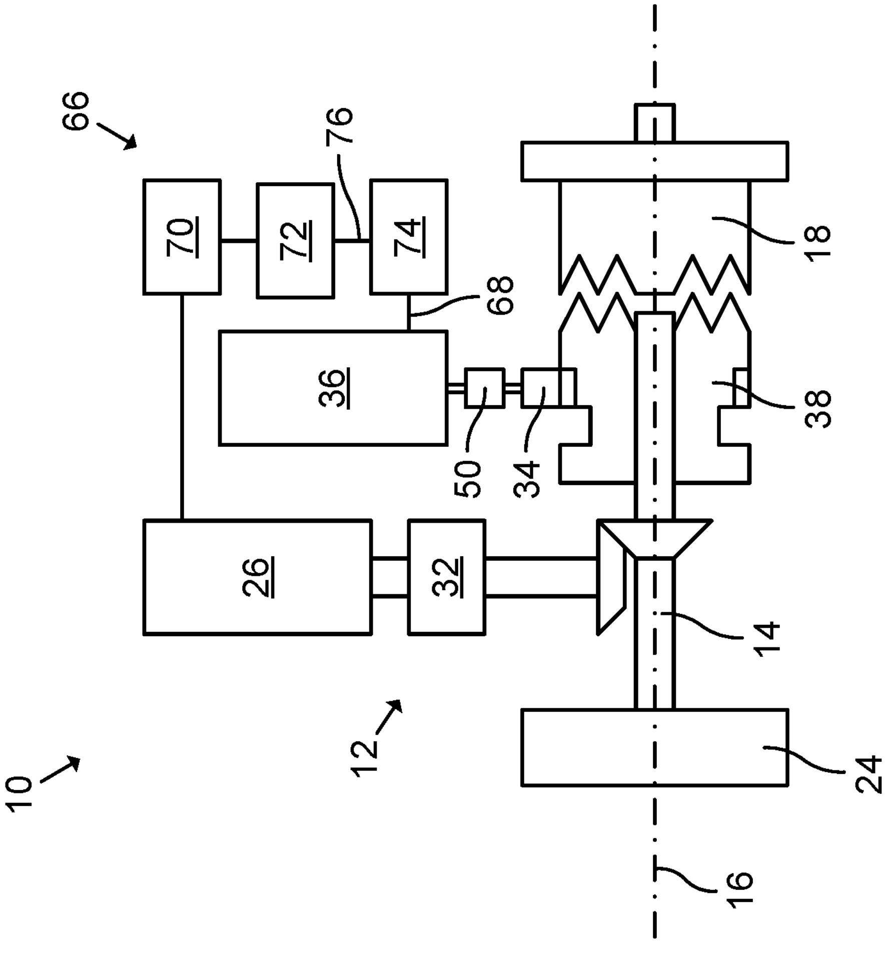
FIG. 4: schematically represents a block diagram of the lock device.

FIG. 4 schematically represents a block diagram of one of many implementations of the lock device 10. The lock device 10 further comprises electronics, generally indicated by reference numeral 66. The electronics 66 is arranged to be electrically powered by the electric generator 26. The electronics 66 is further configured to produce an authorization signal 68 upon authorization of a user. When the authorization signal 68 is received by the electric motor 36, the electric motor 36 drives the actuating member 50 from the first actuating position to the second actuating position.

As illustrated in FIG. 4, the electronics 66 electrically connects the electric generator 26 to the electric motor 36. The electronics 66 of the example in FIG. 4 comprises power management electronics 70, reading electronics 72 and credential evaluation electronics 74. The electric generator 26, the power management electronics 70, the reading electronics 72, the credential evaluation electronics 74 and the electric motor 36 are connected by electric conductors, as shown in FIG. 4. The electric motor 36 is thereby arranged to be electrically powered by the electric generator 26.

The power management electronics 70 of this example comprises energy harvesting electronics, such as diodes (not shown) and a capacitor (not shown). The reading electronics 72 of this example comprises an antenna (not shown) for receiving an input signal, and a reading unit (not shown).

When the knob 24 is manually grabbed and rotated by the hand of a user, the electric generator 26 harvests electric energy from the rotation. When sufficient electric energy has been harvested by the electric generator 26, an authorization process is initiated. During the authorization process, the reading electronics 72 is powered by the power management electronics 70 and can for example communicate wirelessly with an external device, such as with a mobile phone via BLE (Bluetooth Low Energy). The reading electronics 72 receives a credential from the external device and sends an access signal 76, based on the credential, to the credential evaluation electronics 74.

The credential evaluation electronics 74 then determines whether or not access should be granted based on the access signal 76. If the authorization request is denied, the electric motor 36 is not actuated, i.e. the actuating member 50 remains in the first actuating position. If the authorization request is granted, e.g. if a valid credential is presented, the credential evaluation electronics 74 issues an authorization signal 68 to the electric motor 36. When sufficient electric energy has been harvested by the further continuous rotation of the knob 24, the electric motor 36 is actuated to drive the actuating member 50 from the first actuating position to the second actuating position.

Figure 5:
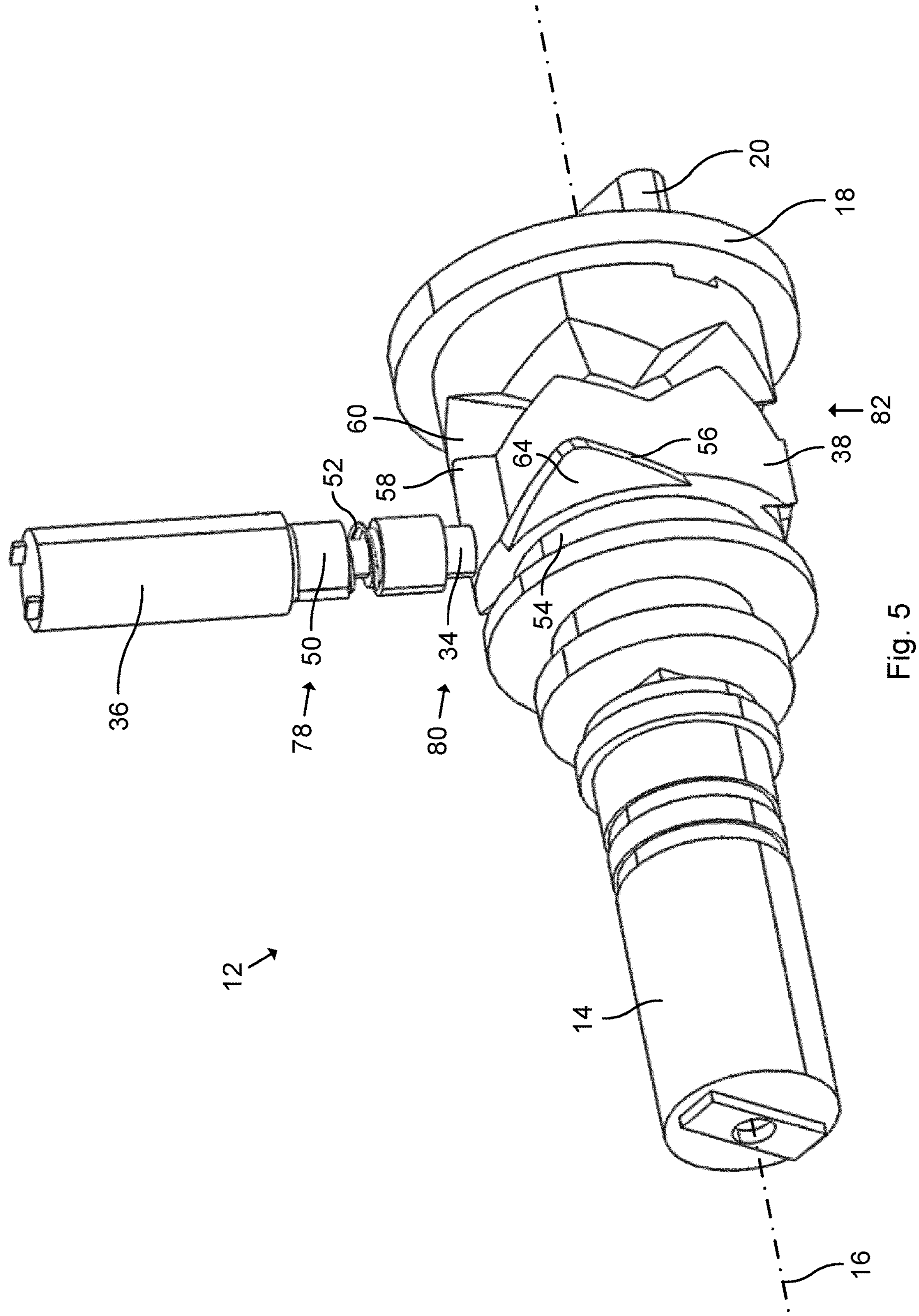
FIG. 5: schematically represents a perspective view of the coupling arrangement when an actuating member is in a first actuating position, an engaging member is in a first position, and a coupling member is in a decoupled position.

FIG. 5 schematically represents a perspective view of the coupling arrangement 12 where the actuating member 50 is in the first actuating position 78, the engaging member 34 is in a first position 80, and the coupling member 38 is in a decoupled position 82. In the decoupled position 82 of the coupling member 38, the first coupling part 58 is spaced from the second coupling part 60 along the rotation axis 16. A rotation of the input element 14 is thereby not transmitted to a rotation of the output element 18. The lock device 10 therefore cannot be unlocked (or locked) by rotation of the knob 24 when the coupling member 38 is in the decoupled position 82.

When the actuating member 50 is in the first actuating position 78, the engaging member 34 is held in the first position 80 by the engaging spring 52. In the first position 80, the engaging member 34 does not engage the coupling member 38. The coupling member 38 is thereby forced to the decoupled position 82 (to the left in FIG. 5) by means of the coupling spring 62.

Figure 6:
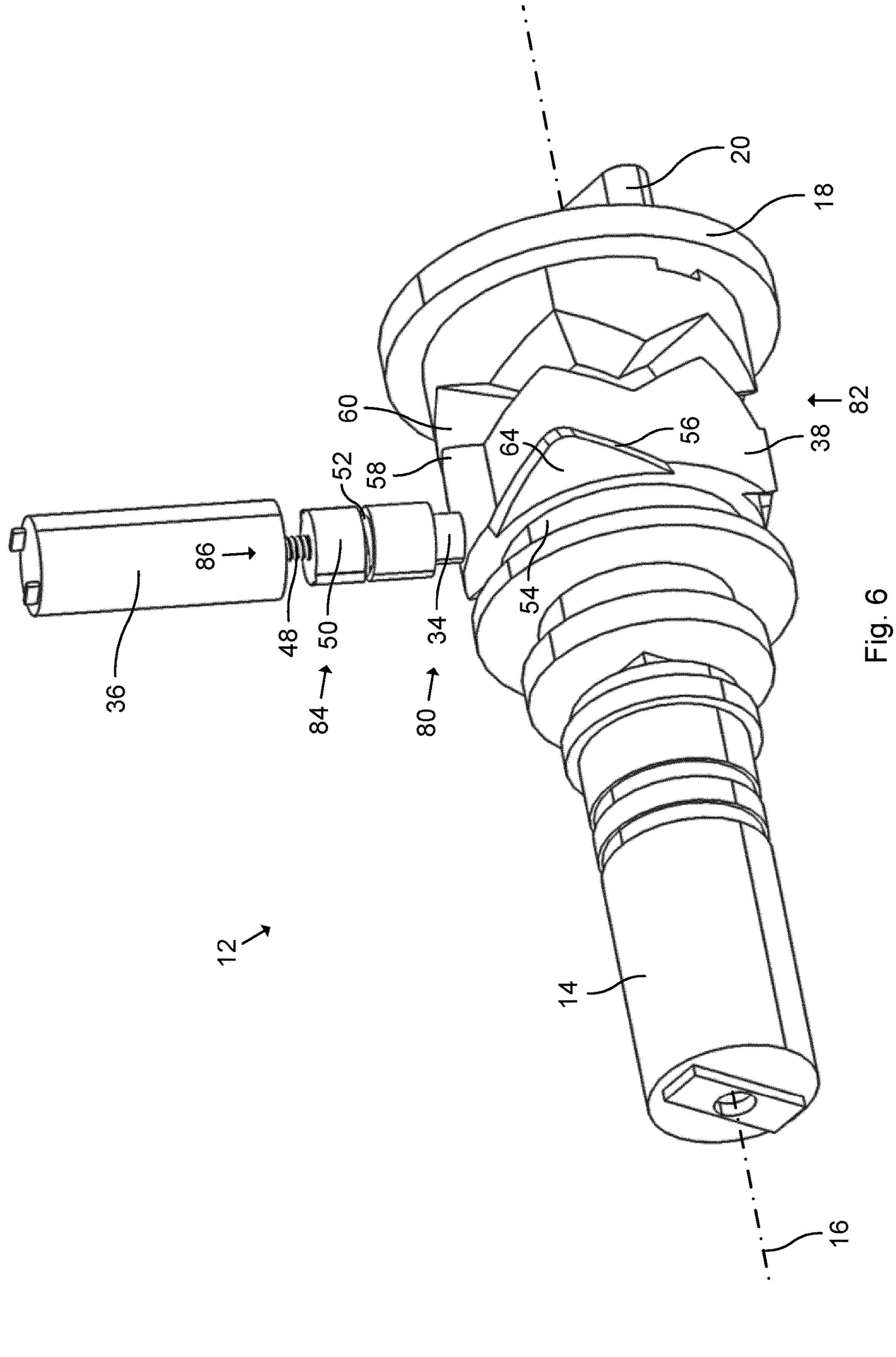
FIG. 6: schematically represents a perspective view of the coupling arrangement when the actuating member is in a second actuating position.

FIG. 6 schematically represents a perspective view of the coupling arrangement 12 when the actuating member 50 has been driven by the electric motor 36 from the first actuating position 78 to the second actuating position 84, e.g. in response to a granted authorization request. As shown in FIG. 6, the engaging member 34 is not aligned with any of the recesses 64. As a consequence, the movement of the actuating member 50 from the first actuating position 78 to the second actuating position 84 causes the engaging spring 52 to be compressed. The engaging member 34 is now forced against an exterior surface of the coupling member 38, radially outside the recesses 64 with respect to the rotation axis 16.

FIG. 6 further shows that the movement of the actuating member 50 from the first actuating position 78 to the second actuating position 84 occurs in an actuating direction 86 perpendicular to the rotation axis 16. Thus, the actuating direction 86 is here angled 90 degrees to the rotation axis 16.

Figure 7:
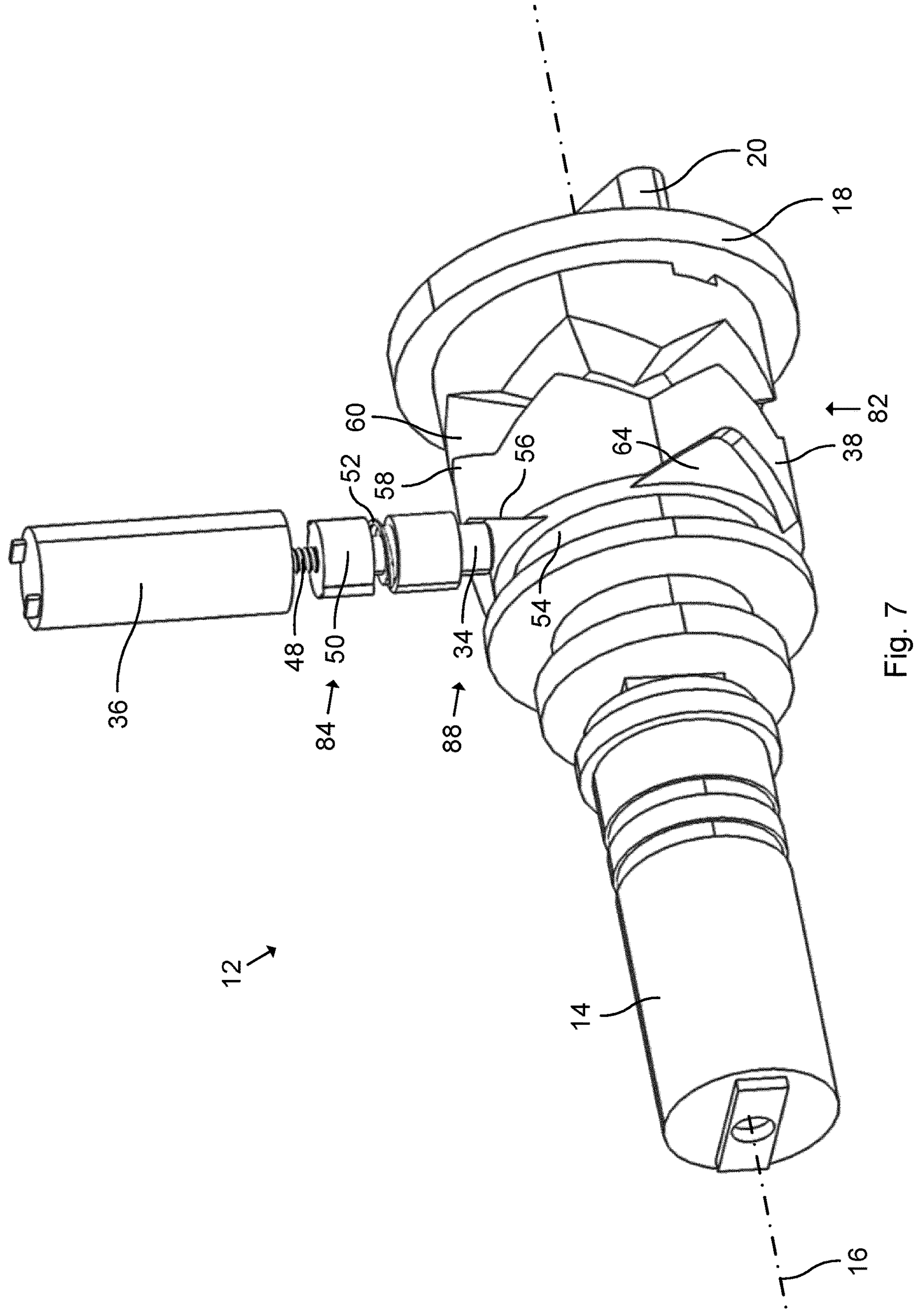
FIG. 7: schematically represents a perspective view of the coupling arrangement when the engaging member is in a second position.

FIG. 7 schematically represents a perspective view of the coupling arrangement 12 when the engaging member 34 is in a second position 88. By manually rotating the knob 24 when the actuating member 50 is in the second actuating position 84, the engaging member 34 eventually becomes aligned with one of the recesses 64 in the coupling member 38. The engaging spring 52 then forces the engaging member 34 to move radially inwards (with respect to the rotation axis 16) from the first position 80 to the second position 88 to engage the coupling member 38. As can be gathered from FIG. 7, a distance moved by the engaging member 34 from the first position 80 to the second position 88 is rather short and substantially corresponds to the depth of the recess 64.

Since the positioning of the actuating member 50 in the second actuating position 84 is a prerequisite for the engaging member 34 to move from the first position 80 to the second position 88, the electric motor 36 is said to be arranged to affect movement of the engaging member 34 from the first position 80 to the second position 88. Note that the coupling member 38 remains in the decoupled position 82 immediately after the engaging member 34 has entered the recess 64.

Figure 8:
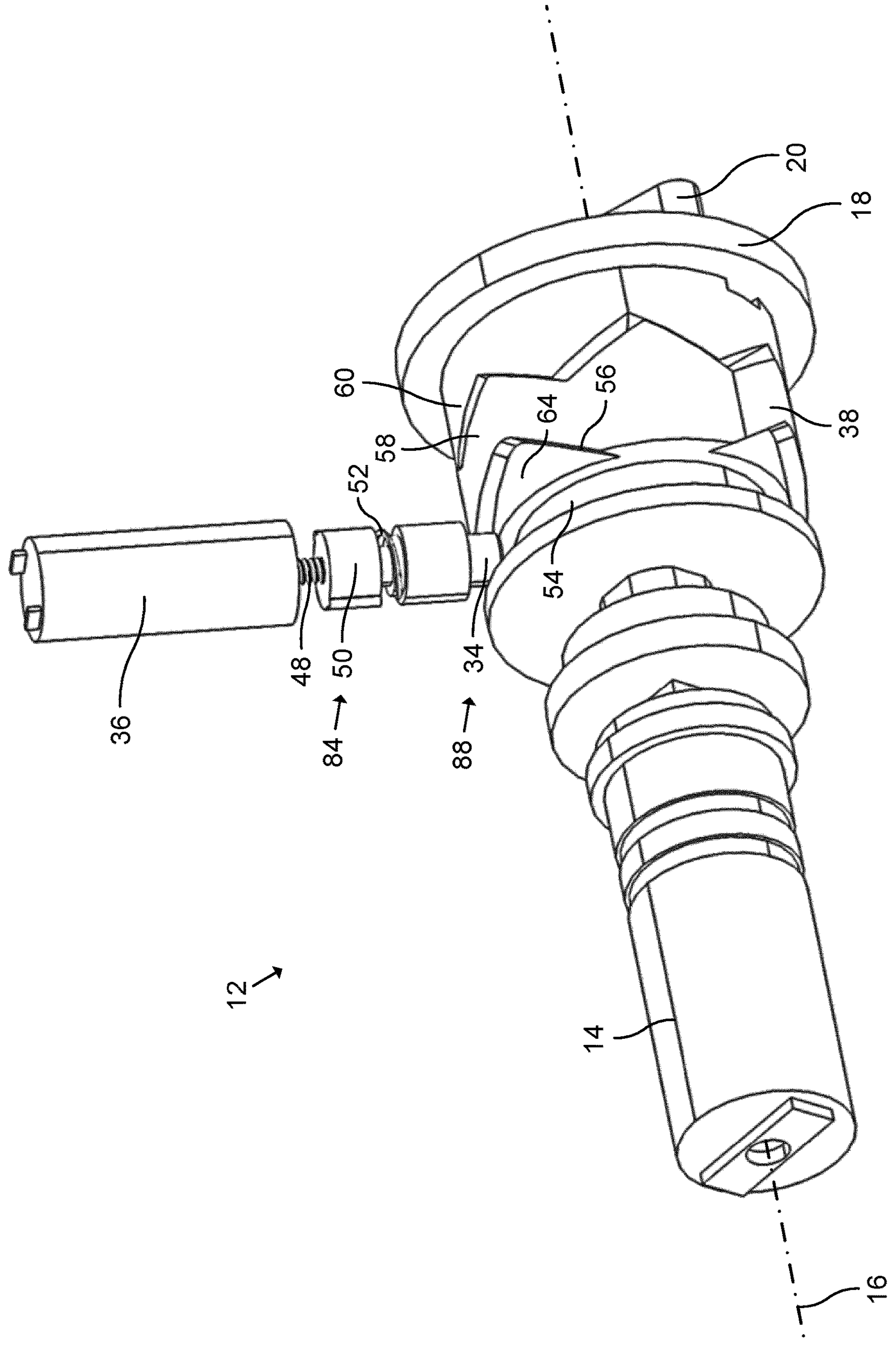
FIG. 8: schematically represents a perspective view of the coupling arrangement when an input element is rotated.

FIG. 8 schematically represents a perspective view of the coupling arrangement 12 when the input element 14 is rotated further by rotation of the knob 24. As shown in FIG. 8, when the engaging member 34 is in the second position 88 and the coupling member 38 is rotated, the engagement between the engaging member 34 and the cam profile 56 causes the coupling member 38 to be pushed forward (to the right in FIG. 8) against the force of the coupling spring 62. The coupling member 38 thereby slides forward over the input element 14 by the manual force rotating the knob 24, and not by the force from the electric motor 36.

Figure 9:
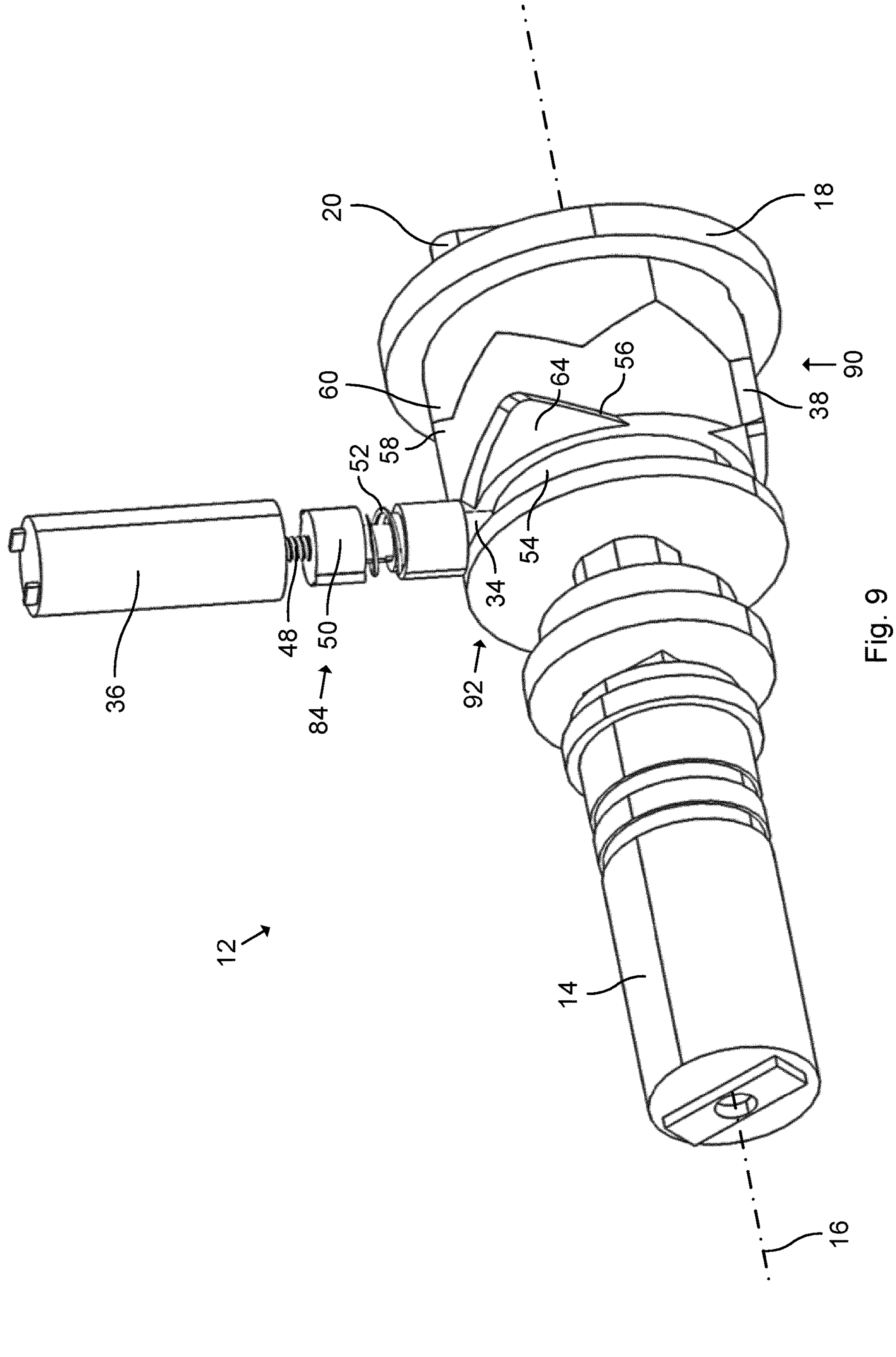
FIG. 9: schematically represents a perspective view of the coupling arrangement when the input element is rotated further, the coupling member is in a coupled position, and the engaging member is in a third position.

FIG. 9 schematically represents a perspective view of the coupling arrangement 12 when the input element 14 is rotated further. As shown in FIG. 9, further rotation of the coupling member 38 has caused the coupling member 38 to be moved further along the rotation axis 16 and into a coupled position 90. At the same time, the input element 14 becomes aligned with the track 54. The engaging spring 52 thereby forces the engaging member 34 to move radially inwards (with respect to the rotation axis 16) from the second position 88 to a third position 92 engaging the track 54. As can be gathered from FIG. 9, a distance moved by the engaging member 34 from the second position 88 to the third position 92 is rather short and substantially corresponds to a radial distance (with respect to the rotation axis 16) between a bottom of the track 54 and a bottom of the recess 64.

By means of the engagement between the engaging member 34 and the cam profile 56 when the engaging member 34 is in the second position 88, a rotation of the coupling member 38 about the rotation axis 16 is transmitted to a movement of the coupling member 38 from the decoupled position 82 to the coupled position 90. In this way, the transmission mechanism, here exemplified by the cam profiles 56, is arranged to transmit a rotation of the coupling member 38 about the rotation axis 16 to a movement of the coupling member 38 along the rotation axis 16 from the decoupled position 82 to the coupled position 90 when the engaging member 34 is in the second position 88.

When the coupling member 38 is in the coupled position 90, the input element 14 and the output element 18 rotate in common by the engagement between the first coupling part 58 and the second coupling part 60. The coupling member 38 is held in the coupled position 90 (by the engaging member 34 being in the third position 92) as long as the actuating member is in the second actuating position 84. Since the positioning of the actuating member 50 in the second actuating position 84 is a prerequisite for the engaging member 34 to move from the second position 88 to the third position 92, the electric motor 36 is said to be arranged to affect movement of the engaging member 34 from the second position 88 to the third position 92.

Figure 10:
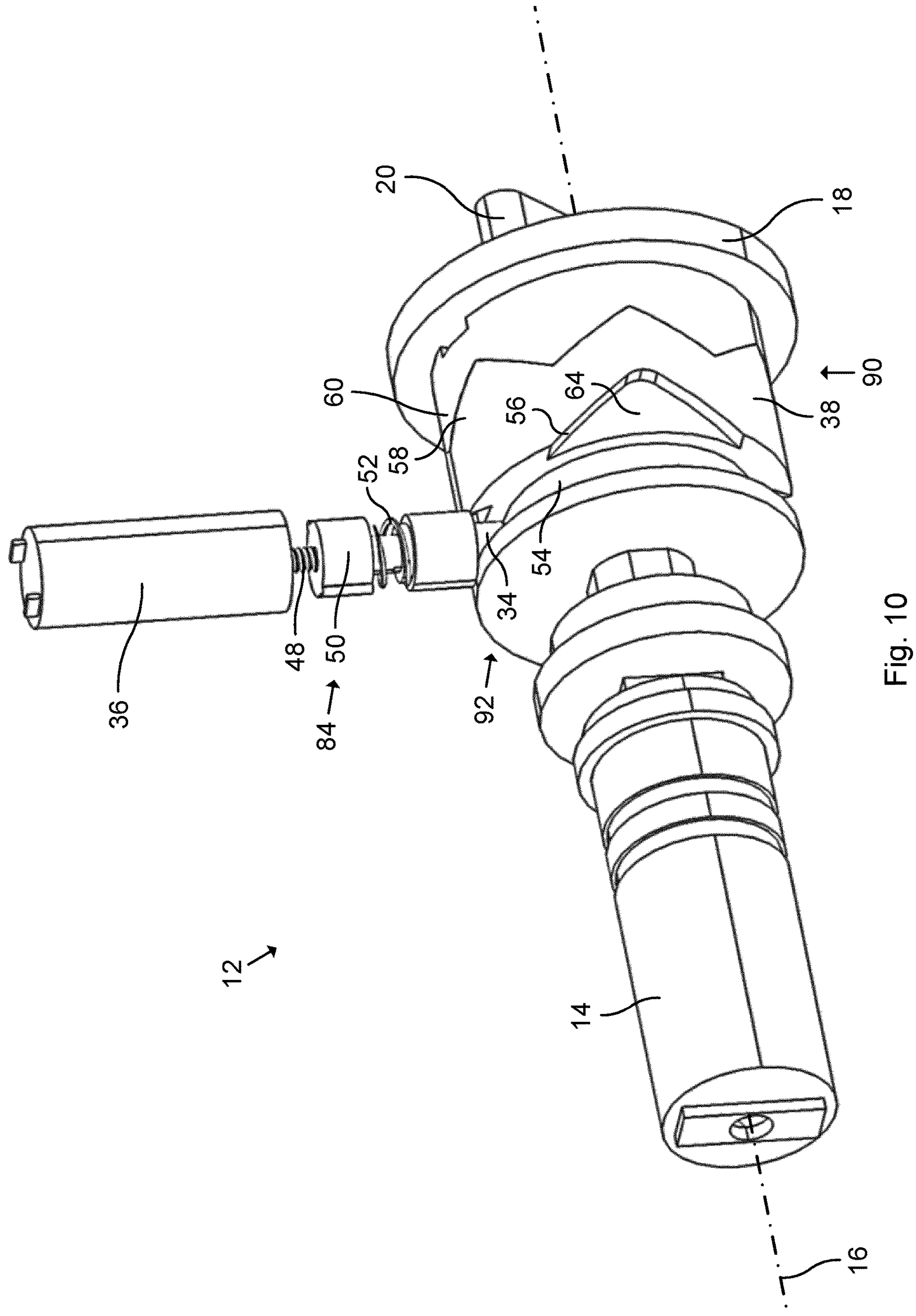
FIG. 10: schematically represents a perspective view of the coupling arrangement when an output element is rotated by rotation of the input member.

FIG. 10 schematically represents a perspective view of the coupling arrangement 12 when the output element 18 is rotated by rotation of the input element 14. The rotation of the tailpiece 20 causes unlocking of the lock device 10, for example by driving a bolt in a lock case (not shown).

The knob 24 can be continuously rotated about the rotation axis 16 during the authorization procedure. Electric energy harvested by manually rotating the knob 24 can thereby be used to authorize a user and to actuate the electric motor 36 to drive the actuating member 50 from the first actuating position 78 to the second actuating position 84. The user can rotate the knob 24 continuously during the authorization process, the subsequent switching process of the actuating member 50, and the subsequent rotation of the tailpiece 20. Thereby, a seamless access is provided.

Figure 11:
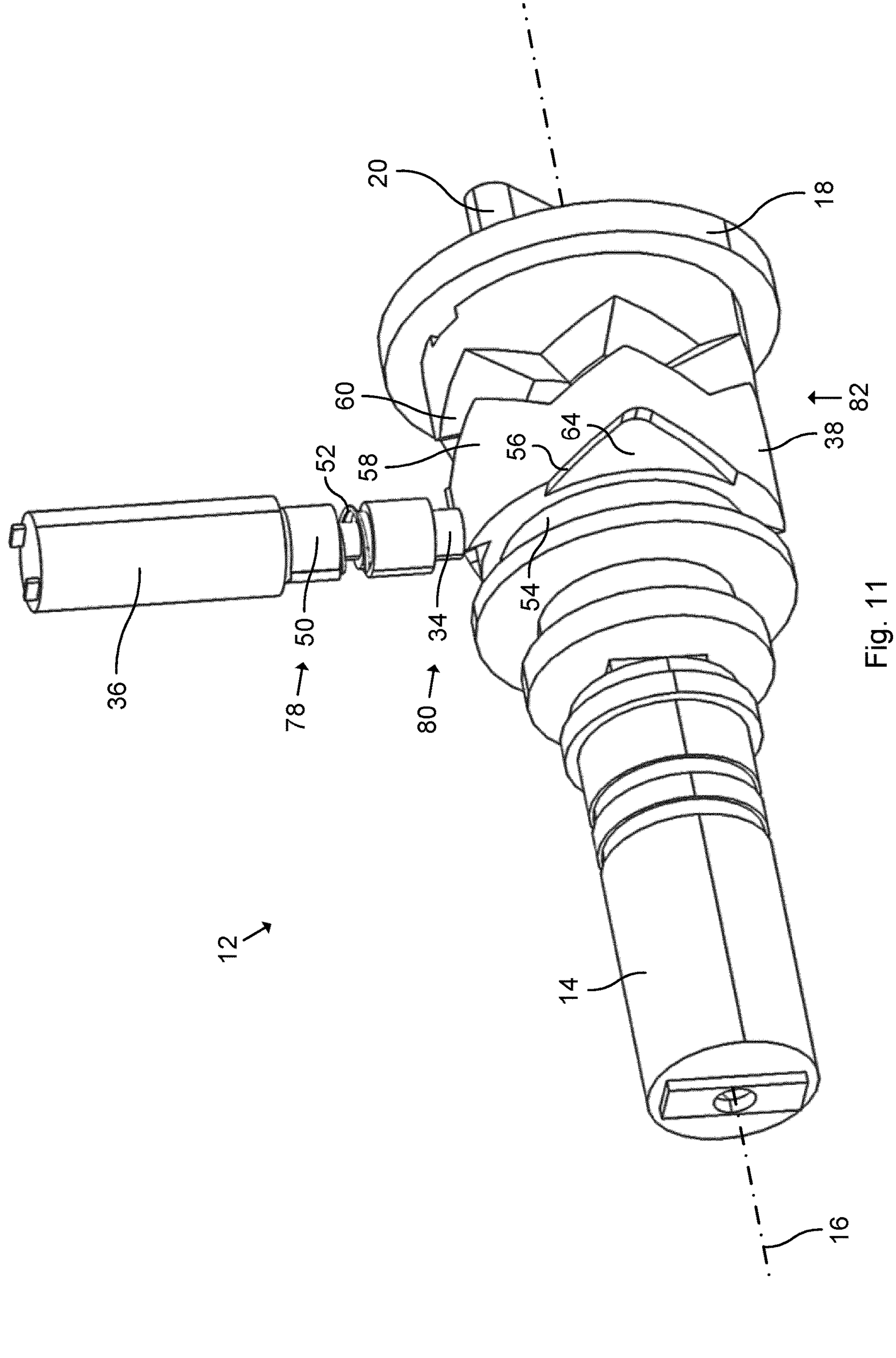
FIG. 11: schematically represents a perspective view of the coupling arrangement when the actuating member has returned to the first actuating position, the engaging member has returned to the first position, and the coupling member has returned to the decoupled position.

FIG. 11 schematically represents a perspective view of the coupling arrangement 12 when the actuating member 50 has returned to the first actuating position 78. When the actuating member 50 returns to the first actuating position 78, the engaging spring 52 pulls the engaging member 34 from the third position 92 out from the track 54 and back to the first position 80. The coupling spring 62 then pushes the coupling member 38 from the coupled position 90 back to the decoupled position 82.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A coupling arrangement for a lock device, the coupling arrangement comprising:

an input element rotatable about a rotation axis;

an output element rotatable about the rotation axis;

an engaging member movable between a first position and a second position;

an electric motor arranged to affect movement of the engaging member between the first position and the second position;

a coupling member rotationally locked to the input element with respect to the rotation axis and axially movable relative to the input element along the rotation axis between a decoupled position, in which a rotation of the input element is not transmitted by the coupling member to a rotation of the output element, and a coupled position, in which a rotation of the input element is transmitted by the coupling member to a rotation of the output element, wherein the coupling member comprises a circular track, and wherein the engaging member is arranged to engage the track; and a transmission mechanism arranged to transmit a rotation of the coupling member to the axial movement of the coupling member from the decoupled position to the coupled position when the engaging member moves to the second position;

wherein the electric motor is arranged to affect movement of the engaging member from the second position to a third position, wherein the second position lies between the first position and the third position, and wherein the engaging member is arranged to engage the track when the engaging member moves to the third position and the coupling member axially moves to the coupled position.

2. The coupling arrangement according to claim 1, wherein the electric motor is arranged to affect linear movement of the engaging member in an actuating direction between the first position and the second position.

3. The coupling arrangement according to claim 2, wherein the actuating direction and the rotation axis are non-parallel.

4. The coupling arrangement according to claim 2, wherein the actuating direction is angled approximately 90 degrees to the rotation axis.

5. The coupling arrangement according to claim 1, further comprising an actuating member arranged to be driven by the electric motor, and an engaging spring arranged to force the engaging member to move relative to the actuating member from the first position towards the second position.

6. The coupling arrangement according to claim 5, wherein the actuating member is movable between a first actuating position and a second actuating position, and wherein the engaging spring is arranged to force the engaging member to move from the first position to the second position when the actuating member moves to the second actuating position.

7. The coupling arrangement according to claim 6, wherein the engaging spring is arranged to force the engaging member to move from the second position to the third position when the actuating member moves to the second actuating position.

8. The coupling arrangement according to claim 1, wherein the transmission mechanism comprises at least one cam profile, and wherein the engaging member is arranged to engage one of the at least one cam profile in the second position.

9. The coupling arrangement according to claim 1, further comprising a coupling arranged to transmit the rotation of the coupling member to the rotation of the output element when the coupling member axially moves to the coupled position.

10. The coupling arrangement according to claim 9, wherein the coupling is a Hirth coupling.

11. The coupling arrangement according to claim 1, further comprising a coupling force device arranged to force the coupling member to axially move towards the decoupled position.

12. A lock device comprising a coupling arrangement according to claim 1.

13. The lock device according to claim 12, further comprising a cylinder housing, wherein the electric motor, the engaging member, and the coupling member are arranged inside the cylinder housing.

14. A coupling arrangement for a lock device, the coupling arrangement comprising:

an input element rotatable about a rotation axis;

an output element rotatable about the rotation axis;

an engaging member movable between a first position and a second position;

an electric motor arranged to affect movement of the engaging member between the first position and the second position;

an actuating member arranged to be driven by the electric motor, and an engaging spring arranged to force the engaging member to move relative to the actuating member from the first position towards the second position, wherein the actuating member is movable between a first actuating position and a second actuating position, and wherein the engaging spring is arranged to force the engaging member to move from the first position to the second position when the actuating member moves to the second actuating position;

a coupling member rotationally locked to the input element with respect to the rotation axis and axially movable relative to the input element along the rotation axis between a decoupled position, in which a rotation of the input element is not transmitted by the coupling member to a rotation of the output element, and a coupled position, in which a rotation of the input element is transmitted by the coupling member to a rotation of the output element, the coupling member comprising a circular track; and a transmission mechanism arranged to transmit a rotation of the coupling member to the axial movement of the coupling member from the decoupled position to the coupled position when the engaging member moves to the second position;

wherein the electric motor is arranged to affect movement of the engaging member from the second position to a third position, wherein the second position lies between the first position and the third position; and wherein the engaging member is arranged to engage the track when the engaging member moves to the third position and the coupling member axially moves to the coupled position.

15. The coupling arrangement according to claim 14, wherein the electric motor is arranged to affect linear movement of the engaging member in an actuating direction between the first position and the second position.

16. The coupling arrangement according to claim 15, wherein the actuating direction and the rotation axis are non-parallel.

17. The coupling arrangement according to claim 14, wherein the transmission mechanism comprises at least one cam profile, and wherein the engaging member is arranged to engage one of the at least one cam profile in the second position.

18. The coupling arrangement according to claim 14, wherein the engaging spring is arranged to force the engaging member to move from the second position to the third position when the actuating member moves to the second actuating position.

19. The coupling arrangement according to claim 14, further comprising a coupling arranged to transmit the rotation of the coupling member to the rotation of the output element when the coupling member axially moves to the coupled position.

* * * * *